United States Patent Office 3,739,009
Patented June 12, 1973

---

3,739,009
PRODUCTION OF AROMATIC O-AMINONITRILES
Hans Juergen Sturm, Gruenstadt, and Helmut Junge, Wachenheim, Germany, assignors to Badische Anilin- & Soda-Fabrik Aktiengesellschaft, Ludwigshafen (Rhine), Germany
No Drawing. Filed Nov. 12, 1970, Ser. No. 89,036
Claims priority, application Germany, Nov. 15, 1969, P 19 57 590.7; Oct. 7, 1970, P 20 49 161.6
Int. Cl. C07c 121/12; C09b 1/20
U.S. Cl. 260—465 B                          8 Claims

ABSTRACT OF THE DISCLOSURE

Manufacture of aromatic o-aminonitriles by reaction of aromatic o-aminocarboxamides with dehydrating agents. Aromatic o-aminonitriles are intermediates in the manufacture of dyes.

---

This invention relates to a process for the manufacture of aromatic o-aminonitriles from aromatic o-aminocarboxamides.

Supplementum zu Chimia, 1968, Synthese und Reaktionsmechanismen in der Farbstoffchemie, p. 72, discloses that 2-amino-5-nitrobenzonitrile may be obtained by reacting 2-chloro-4-nitro-aniline with a cuprous cyanide/pyridine complex. This process has the disadvantage that the product of the reaction must be carefully separated from the copper used in the reaction and this is an expensive operation. Furthermore, the copper must be recovered. The cited publication also reveals that 2-amino-5-nitrobenzonitrile may be obtained by nitrating o-chlorobenzonitrile followed by amination. This process has the drawback that 3,5-dinitro compounds are also formed and these are difficult to separate. Another method described in the cited publication is to prepare 2-amino-5-nitrobenzonitrile by converting 2-chloro-5-nitrobenzoic acid to 2-chloro-5-nitrobenzonitrile followed by amination. This method suffers from the disadvantage that it proceeds via a number of steps making it necessary to tolerate considerable reductions in yield. Moreover, the quality of the product thus formed fails to satisfy technical requirements, since in the subsequent manufacture of dyes even slight impurities cause considerable differences in shade.

It is an object of the present invention to provide a process for the manufacture of o-aminonitriles that gives good yields. It is another object of the invention to provide a process in which aromatic o-aminonitriles are produced in a pure state such that they may be used without purification.

In accordance with the present invention these and other objects and advantages are achieved in a process for the manufacture of aromatic o-aminonitriles in which aromatic o-amino-carboxamides are reacted with dehydrating agents.

The novel method is surprising in that one would have expected a detrimental reaction to take place between the dehydrating agents and the free amino groups present in the starting compound. In Houben Weyl "Methoden der organischen Chemie," vol. 8, 1952, the statement is made on page 330 that carboxamides containing amino groups are unsuitable starting materials for the manufacture of nitriles. The same work (loc. cit, vol. 11/2 (1958), pp. 738-741, and loc. cit. vol. 12/2 (1964), pp. 383-390) also states that primary amines readily react with thionyl chloride to form thionyl imines or with phosphorus oxytrichloride to form amidophosphoryl dichloride. Furthermore, Liebigs Annalen der Chemie, vol. 274 (1893), p. 315, states that m-aminobenzamide does not react with thionyl chloride to form the corresponding nitrile. Thus it was not to be expected that aromatic o-aminocarboxamides could be converted to aromatic o-aminonitriles in a simple manner.

Preferred aromatic o-aminocarboxamides are those derived from benzene, naphthalene and anthraquinone. In addition to their amino and carboxamide groups they may also contain substituents which are inert under the conditions of the reaction, for example bromine and chlorine atoms or nitro groups. Particularly interesting starting materials are 2-aminobenzamides of the formula:

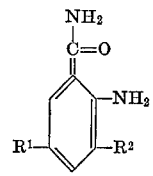

in which $R^1$ stands for hydrogen, chlorine, bromine or nitro and $R^2$ stands for hydrogen, chlorine, or bromine and may also stand for nitro when $R^1$ stands for chlorine or bromine. In addition, particularly suitable starting materials are anthraquinones of the formula:

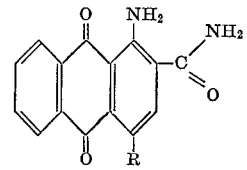

in which R stands for hydrogen, chlorine, bromine or nitro. Suitable starting materials are, for example, 3-chloro-5-nitroanthranilamide, 3-bromo-5-nitroanthranilamide, 3,5-dichloroanthranilamide, anthranilamide, 5-chloro-anthranilamide, 1-aminoanthraquinone-2-carboxamide and 1-amino-4-nitroanthraquinone-2-carboxamide.

5-nitroanthranilamide may be prepared in a simple manner, for example by nitrating isatic anhydride followed by reacting with ammonia.

Preferred dehydrating agents are phosphorus pentoxide, phosphorus pentachloride, phosphorus oxychloride and thionyl chloride. Phosphorus oxychloride has proved particularly useful for the present reaction.

Conveniently, there are used, per mole of aromatic o-aminocarboxamide, from 0.5 to 10 moles, in particular from 1 to 3 moles, of dehydrating agent. In general, the reaction is carried out at a temperature of from 20° to 120° C. Particularly good results are obtained when temperatures of from 70° to 100° C. are used.

We have found it advantageous to carry out the reaction in the presence of salts of metals in Groups I and II of the Periodic Table or in the presence of ammonium salts, particularly those derived from mineral acids and lower fatty acids. Particularly suitable are salts of the said metals with mineral acids, examples being sodium chloride, potassium chloride, ammonium carbonate, ammonium bicarbonate, calcium chloride, sodium carbonate, sodium carbonate, sodium bicarbonate, sodium acetate and sodium sulfate. Because of their ready availability, amonium, sodium, potassium and calcium salts are preferred.

Advantageously, from 5 to 20 parts by weight of the said salts are used per 100 parts by weight of aromatic o-aminocarboxamide.

It is possible to carry out the reaction in the presence of inert solvents or diluents such as chlorinated hydrocarbons, for example chlorobenzene, o-dichlorobenzene or tetrachloroethane, and hydrophilic solvents such as ethers, for example dioxane. Where hydrophilic solvents are used, we have found it particularly convenient to include tertiary amines such as pyridine or lower trialkylamines, in which case it is advantageous to use from 1 to 3 moles of tertiary amine per mole of dehydrating agent.

Where phosphorus pentoxide is used as the dehydrating agent we have found it advantageous to use N-methyl pyrrolidone as solvent.

The process of the invention may be carried out, for example, by placing the aromatic o-aminocarboxamide in a vessel optionally together with solvents and in the presence or absence of tertiary amines and adding the dehydrating agent. The reaction is carried out at the temperatures stated above and is generally complete after from 10 to 60 minutes. The aromatic o-aminonitrile precipitated from the reaction mixture may be removed by usual techniques, for example by filtration or decantation and, if necessary, washed free of adhering impurities with suitable agents such as methylene chloride.

The o-aminonitriles produced by the process of the invention are suitable for the production of dyes, for example disperse dyes.

In the following examples the parts are by weight.

EXAMPLE 1

To 30 parts of 5-nitroanthranilamide there are added 100 parts of phosphorus oxytrichloride and the mixture is stirred for 15 minutes at from 80° to 90° C. After cooling, the precipitated solid is filtered off, washed successively with methylene chloride and water until neutral and then dried. There are thus obtained 20.5 parts (75.5% of theory) of 2-amino-5-nitrobenzonitrile, M.P. 204–206° C.

EXAMPLE 2

20 parts of 5-nitroanthranilamide in 100 parts by volume of nitrobenzene are stirred for 15 minutes at from 100° to 110° C. with 32 parts of phosphorus oxytrichloride. The reaction mixture is allowed to cool to 20° C. and the precipitated nitrile is filtered off. The solid residue is washed with a little nitrobenzene and then with methylene chloride and dried. There are this obtained 11.3 parts (63.5% of theory) of 2-amino-5-nitrobenzonitrile, M.P. 201–202° C.

EXAMPLE 3

40 parts of 5-nitroanthranilamide in 60 parts of chlorobenzene are mixed with 100 parts of phosphorus oxytrichloride and stirred for 15 minutes at 80–90° C. After cooling, the mixture is filtered and the solid residue is washed successively with methylene chloride and water until neutral and then dried. There are thus obtained 28.4 parts (80% of theory) of 2-amino-5-nitrobenzonitrile, M.P. 199–200° C.

EXAMPLE 4

To 30 parts of 5-nitroanthranilamide there are added 100 parts of phosphorus oxytrichloride and the mixture is stirred for 15 minutes at 80–90° C. After cooling, the mixture is hydrolyzed in ice and the precipitate is filtered off and washed with water until neutral. After drying, there are obtained 20 parts (75% of theory) of 2-amino-5-nitrobenzonitrile, M.P. 199–200° C.

EXAMPLE 5

30 parts of 5-nitroanthranilamide are stirred with 100 parts of phosphorous oxytrichloride for 1 hour at 70–80° C. After cooling, the mixture is filtered and the solid residue is washed successively with methylene chloride and water until neutral. After drying, there are obtained 16.9 parts (63.5% of theory) of 2-amino-5-amino-5-nitrobenzonite, M.P. 198–200° C.

EXAMPLE 6

To 54 parts of 5-nitroanthranilamide and 60 parts of triethylamine in 100 parts by volume of dioxane there are added over 20 minutes 30 parts of phosphorus oxytrichloride at 70° C., and the mixture is stirred for a further 30 minutes at 80–85° C. After cooling, the mixture is hydrolyzed in water and the precipitate is washed with water until neutral and dried. There are thus obtained 39.4 parts (81.5% of theory) of 2-amino-5-nitrobenzonitrile, M.P. 195–198° C.

EXAMPLE 7

To 360 parts of 5-nitroanthranilamide and 36 parts of soda there are added 1,080 parts of phosphorus oxychloride and the mixture is stirred for 30 minutes at 70–85° C. After cooling, the precipitate is filtered off and washed successively with methylene chloride and water until neutral and then dried. There are thus obtained 287 parts (88% of theory) of 2-amino-5-nitrobenzonitrtile, M.P. 207–208° C.

EXAMPLE 8

60 parts of 5-nitroanthranilamide together with 6 parts of ammonium carbonate are reacted with 180 parts of phosphorus oxychloride for 15 minutes at 85–90° C. After cooling and working up in the manner described in Example 7, there are obtained 43.6 parts (80.5% of theory) of 2-amino-5-nitrobenzonitrile, M.P. 207–209° C.

EXAMPLE 9

To 181 parts of 5-nitroanthranilamide in 300 parts by volume of N-methyl pyrrolidone there are added 170 parts of phosphorus pentoxide, and the mixture is stirred for 2 hours at 80° C. After cooling, the reacting mixture is mixed with water and the precipitate is filtered off. The solid residue is then washed with water until neutral and dried. There are thus obtained 148 parts (91% of theory) of 2-amino-5-nitrobenzonitrile, M.P. 202–204° C.

EXAMPLE 10

181 parts of 5-nitroanthranilamide and 230 parts of phosphorus pentachloride are heated in 400 parts by volume of dioxane at 40° C. for 1 hour with stirring, the hydrogen chloride formed being removed by passing nitrogen over the reaction mixture. The cooled reaction mixture is then poured into 320 parts by volume of water and stirred for a further hour. The precipitate is then filtered off and washed with water until neutral and dried. There are thus obtained 157 parts (96% of theory) of 2-amino-5-nitrobenzonitrile, M.P. 203–204° C.

EXAMPLE 11

2-Amino-3-chloro-5-nitrobenzonitrile 43 parts of 3-chloro-5-nitroanthranilamide are reacted with 173 parts of phosphorus oxychloride for 30 minutes at 90–100° C. After cooling to room temperature, the precipitated product is filtered off and washed successively with carbon tetrachloride and water until neutral and then dried. There are thus obtained 30.2 parts (76.5% of theory) of 2-amino-3-chloro-5-nitrobenzonitrile, M.P. 185–187° C. By concentrating the filtrate a further 5.9 parts (14.9% of theory) of 2-amino-3-chloro-5-nitrobenzonitrile are obtained.

EXAMPLE 12

2-amino-3-bromo-5-nitrobenzonitrile 130 parts of 3-bromo-5-nitroanthranilamide are reacted with 1,300 parts of phosphorus oxychloride at 90–100° C. The clear solution is allowed to cool to room temperature slowly, and the precipitated product is filtered off and washed successively with carbon tetrachloride and water until neutral and then dried. There are thus obtained 89 parts (73.5% of theory) of 2-amino-5-nitrobenzonitrile, M.P. 190–192° C.

EXAMPLE 13

2-amino-3,5-dichlorobenzonitrile 205 parts of 3,5-dichloroanthranilamide are reacted with 800 parts of phosphorus oxychloride for 20 minutes under reflux. After cooling, the reaction mixture is poured onto ice, and the precipitate is filtered off and washed with water until neutral. After drying, there are obtained 158 parts (84.5% of theory) of 2-amino-3,5-dichlorobenzonitrile, M.P. 121–122° C.

EXAMPLE 14

2-aminobenzonitrile 272 parts of anthranilamide and 500 parts of phosphorus pentachloride are heated in 600 parts by volume of dioxane at 40° C. for 1 hour with stirring, the hydrogen chloride formed being removed by passing nitrogen over the reaction mixture. The cooled reaction solution is poured into 3200 parts by volume of water, stirred for 1 hour at room temperature, adjusted to pH 7 with sodium hydroxide and extracted a number of times with methylene chloride. The combined organic extracts are dried, concentrated and distilled in vacuo to give 203 parts (86% of theory) of 2-aminobenzonitrile, M.P. 49–50° C.

EXAMPLE 15

2-aminobenzonitrile 272 parts of anthranilamide are reacted with 450 parts of phosphorus pentachloride in 1,200 parts by volume of ethylene chloride at 25–30° C. After 1 hour the mixture is hydrolyzed with 2,000 parts by volume of water. The mixture is stirred for a further 2 hours at room temperature and adjusted to pH 7 with sodium hydroxide. The organic phase is separated and the solvent distilled off. The residue is distilled in vacuo to give 193 parts (81.5% of theory) of 2-aminobenzonitrile, M.P. 49–50° C.

EXAMPLE 16

2-amino-5-chlorobenzonitrile

To 171 parts of 5-chloroanthranilamide and 250 parts of phosphorus pentachloride there are added 350 parts by volume of dioxane, and the mixture is stirred for 45 minutes at 40° C., the hydrogen chloride formed being removed by passing nitrogen over the reaction mixture or by applying a weak vacuum. The cooled reaction solution is poured into 2,000 parts by volume of water, stirred for 1 hour at 50° C., cooled to 5° C. and filtered. The solid reaction product is then washed with water until neutral and dried. There are thus obtained 140 parts (92% of theory) of 2-amino-5-chlorobenzonitrile, M.P. 92–93° C.

EXAMPLE 17

2-amino-5-chlorobenzonitrile

To 171 parts of 5-chloroanthranilamide in 600 parts by volume of ethylene chloride there are added, at 25–30° C., 250 parts of phosphorus pentachloride portionwise, the mixture then being stirred for 45 minutes. The mixture is then poured into 1,600 parts by volume of water, and the resulting mixture is stirred for 2 hours at 50° C., adjusted to pH 7 with sodium hydroxide and steam distilled to remove the organic solvent. After cooling, the mixture is filtered, and the residue is dried and distilled in vacuo to give 125 parts (82% of theory) of 2-amino-5-chlorobenzonitrile, M.P. 93–94° C.

EXAMPLE 18

2-amino-3-chloro-5-nitrobenzonitrile

To 215 parts of 3-chloro-5-nitroanthranilamide in 420 parts by volume of N-methyl pyrrolidone there are added 150 parts of phosphorus pentoxide, and the mixture is stirred for 2 hours at 80–90° C. After cooling, 850 parts of water are added to the reaction mixture and the precipitate is filtered off and washed with water until neutral. After drying, there are obtained 194 parts (98% of theory) of 2-amino-3-chloro-5-nitrobenzonitrile, M.P. 181–183° C.

EXAMPLE 19

2-amino-3,5-dichlorobenzonitrile

To 250 parts of 3,5-dichloroanthranilamide in 300 parts of N-methyl pyrrolidone there are added 150 parts of phosphorus over 1 hour at 80° C., the mixture then being stirred for 2 hours at 90° C. The reaction mixture is allowed to cool to 50° C. and is then hydrolyzed with 1,000 parts by volume of water. The precipitate is filtered off and washed with water until neutral and then dried. There are thus obtained 150 parts (80% of theory) of 2-amino-3,5-dichlorobenzonitrile, M.P. 120–123° C.

EXAMPLE 20

1-amino-2-cyanoanthraquinone 175 parts of phosphorus pentoxide are added to a mixture of 166 parts of 1-aminoanthraquinone-2-carboxamide and 1,250 of N-methyl pyrrolidone at 100° C., the mixture then being stirred for 3 hours at 100° C. The reaction mixture is cooled to 50° C. and then mixed with 2500 parts by volume of water. The precipitate is filtered off, washed with water until neutral and dried. There are thus obtained 110 parts (71% of theory) of 1-amino-2-cyanoanthraquinone. A sample recrystallized from chlorobenzene has M.P. 260–261° C.

EXAMPLE 21

1-amino-2-cyano-4-nitroanthraquinone

To a mixture of 156 parts of 2-amino-4-nitro-anthraquinone-2-carboxamide and 1,000 parts by volume of N-methyl pyrrolidone there are added 120 parts of phosphorus pentoxide at 100° C. The mixture is then stirred for 2 hours at 100° C. The reaction mixture is allowed to cool to 50° C., and 2,000 parts by volume of water are added. The precipitated solid is filtered off and washed with water until neutral and then dried. There are thus obtained 135 parts (92% of theory) of 1-amino-2-cyano-4-nitroanthraquinone. A sample recrystallized from chlorobenzene has M.P. 296–299° C.

We claim:

1. A process for the manufacture of an aromatic o-aminonitrile which comprises reacting an aromatic o-aminocarboxamide selected from the class consisting of (A) the 2-aminobenzamides of the formula

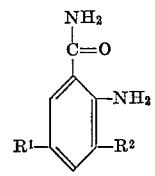

wherein $R^1$ is hydrogen, chlorine, bromine or nitro and $R^2$ is hydrogen, chlorine or bromine or wherein $R^2$ may further be nitro and $R'$ is chlorine or bromine, and (B) the anthraquinones of the formula

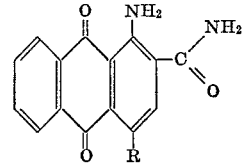

wherein R is hydrogen, chlorine, bromine or nitro, with a dehydrating agent selected from the class consisting of phosphorus pentoxide, phosphorus pentachloride, phosphorous oxychloride and thionyl chloride in a molar ratio of 1:0.5 to 1:10 at temperatures ranging from 20° to 120° C.

2. A process as claimed in claim 1 in which the aromatic o-aminocarboxamide starting material used is 5-nitroanthranilamide.

3. A process as claimed in claim 1 in which there are used, per mole of aromatic o-aminocarboxamide, from 1 to 3 moles of dehydrating agent.

4. A process as claimed in claim 1 in which the temperatures used range from 70° to 100° C.

5. A process as claimed in claim 1 in which the reaction is carried out in the presence of salts of metals in main groups I and II of the Periodic Table or ammonium salts of mineral acids or lower fatty acids.

6. A process as claimed in claim 1 wherein the reaction is carried out in the presence of the salt of a metal selected from the group consisting of sodium, potassium and calcium.

7. A process as claimed in claim 1 wherein the reaction is carried out in the presence of the salt of ammonium with a mineral acid or a lower fatty acid.

8. A process as claimed in claim 1 wherein the dehydrating agent is phosphorous oxychloride.

References Cited

UNITED STATES PATENTS

| 3,317,585 | 5/1967 | Hershmann | 260—465.2 |
| 3,459,783 | 8/1969 | Budrick | 260—465.2 |

LORRAINE A. WEINBERGER, Primary Examiner

R. GERSTL, Assistant Examiner

U.S. Cl. X.R.

260—378, 381

UNITED STATES PATENT OFFICE
CERTIFICATE OF CORRECTION

Patent No. 3,739,009    Dated June 12, 1973

Inventor(s) Hans Juergen Sturm and Helmut Junge

It is certified that error appears in the above-identified patent and that said Letters Patent are hereby corrected as shown below:

Column 2, lines 10 to 16, " 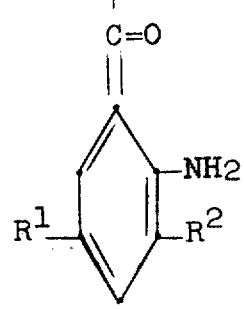 " should read

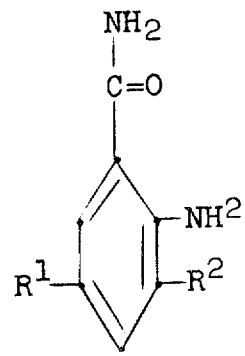 --.

Column 2, line 57, delete "sodium carbonate".

Column 3, line 64, "zonite" should read -- zonitrile --.

Column 4, line 8, "2-amino-5-nitrobenzonitrtile" should read -- 2-amino-5-nitrobenzonitrile --.

Column 6, line 51, claim 1, "and R'" should read -- when $R^1$ --

Signed and sealed this 20th day of November 1973.

(SEAL)
Attest:

EDWARD M. FLETCHER, JR.
Attesting Officer

RENE D. TEGTMEYER
Acting Commissioner of Patents